US012579199B2

(12) United States Patent
Balwani

(10) Patent No.: US 12,579,199 B2
(45) Date of Patent: Mar. 17, 2026

(54) SYSTEMS AND METHODS FOR TRACKING DOCUMENT REUSE AND AUTOMATICALLY UPDATING DOCUMENT FRAGMENTS ACROSS ONE OR MORE PLATFORMS

(71) Applicant: Wolters Kluwer DXG U.S., Inc., Riverwoods, IL (US)

(72) Inventor: Dharmendra Balwani, Oswego, IL (US)

(73) Assignee: Wolters Kluwer DXG U.S., Inc., Riverwoods, IL (US)

( * ) Notice: Subject to any disclaimer, the term of this patent is extended or adjusted under 35 U.S.C. 154(b) by 48 days.

(21) Appl. No.: 18/599,651

(22) Filed: Mar. 8, 2024

(65) Prior Publication Data

US 2025/0284746 A1      Sep. 11, 2025

(51) Int. Cl.
*G06F 12/0875* (2016.01)
*G06F 16/93* (2019.01)

(52) U.S. Cl.
CPC .......... *G06F 16/93* (2019.01); *G06F 12/0875* (2013.01)

(58) Field of Classification Search
CPC .............................. G06F 16/93; G06F 12/0875
See application file for complete search history.

(56) References Cited

U.S. PATENT DOCUMENTS 6,470,306 B1 * 10/2002 Pringle ................. G06F 40/169
715/236
7,917,846 B2      3/2011 Decker et al.

10,275,430 B2      4/2019 Mullins et al.
2007/0204003 A1 *  8/2007 Abramson .............. H04L 67/06
709/217
2008/0235300 A1 *  9/2008 Nemoto ................ G06F 16/119
2008/0240039 A1 * 10/2008 Parekh .................. H04W 36/02
370/331

(Continued)

OTHER PUBLICATIONS

International Search Report and Written Opinion issued in corresponding Application No. PCT/US2025/018575, dated Oct. 6, 2025, 11 pages.

(Continued)

*Primary Examiner* — Vaishali Shah
(74) *Attorney, Agent, or Firm* — Morgan, Lewis & Bockius LLP

(57)      ABSTRACT

Systems and methods of content reuse are disclosed. A user input may be received to include a portion of a source document, from a source system, into a target document. The source document may be associated with a source document identifier. A cache document, including a cache fragment may be generated. The cache fragment may include the portion of the source document. A cache document identifier associated with the cache document may be generated. The cache document identifier may be associated with the source document identifier. A target document including a target fragment may be generated. The target fragment may include the cache fragment from the cache document. A target fragment identifier associated with the target fragment may be generated. The target fragment identifier may be associated with the cache document identifier, the source document identifier, or both the cache document identifier and the source document identifier.

20 Claims, 6 Drawing Sheets

(56)                    References Cited

U.S. PATENT DOCUMENTS

| | | | | |
|---|---|---|---|---|
| 2010/0011033 A1* | 1/2010 | Czeczulin | ........... | G06Q 10/107 |
| | | | | 709/206 |
| 2012/0131309 A1* | 5/2012 | Johnson | ................. | G06F 9/323 |
| | | | | 712/E9.004 |
| 2015/0180741 A1* | 6/2015 | Buchanan | ............. | H04L 67/535 |
| | | | | 709/213 |
| 2021/0224472 A1* | 7/2021 | Kobayashi | ........... | G06V 30/414 |
| 2021/0342785 A1* | 11/2021 | Mann | .................... | G06F 40/186 |
| 2023/0409816 A1 | 12/2023 | Chen et al. | | |

OTHER PUBLICATIONS

Lorenz J: "So Funktioniert Ole", Chip Zeitschrift Fuer Mikrocomputer-Technik, Vogel Verlag. Wurzburg, DE, No. 7, (Jul. 1, 1996), pp. 208-211.
"Object Linking and Embedding—Wikipedia", (Jul. 28, 2020), pp. 1-8, retrieved from the internet: URL:https://en.wikipedia.org/wiki/Object_Linking_and_Embedding.

* cited by examiner

300 ⟍

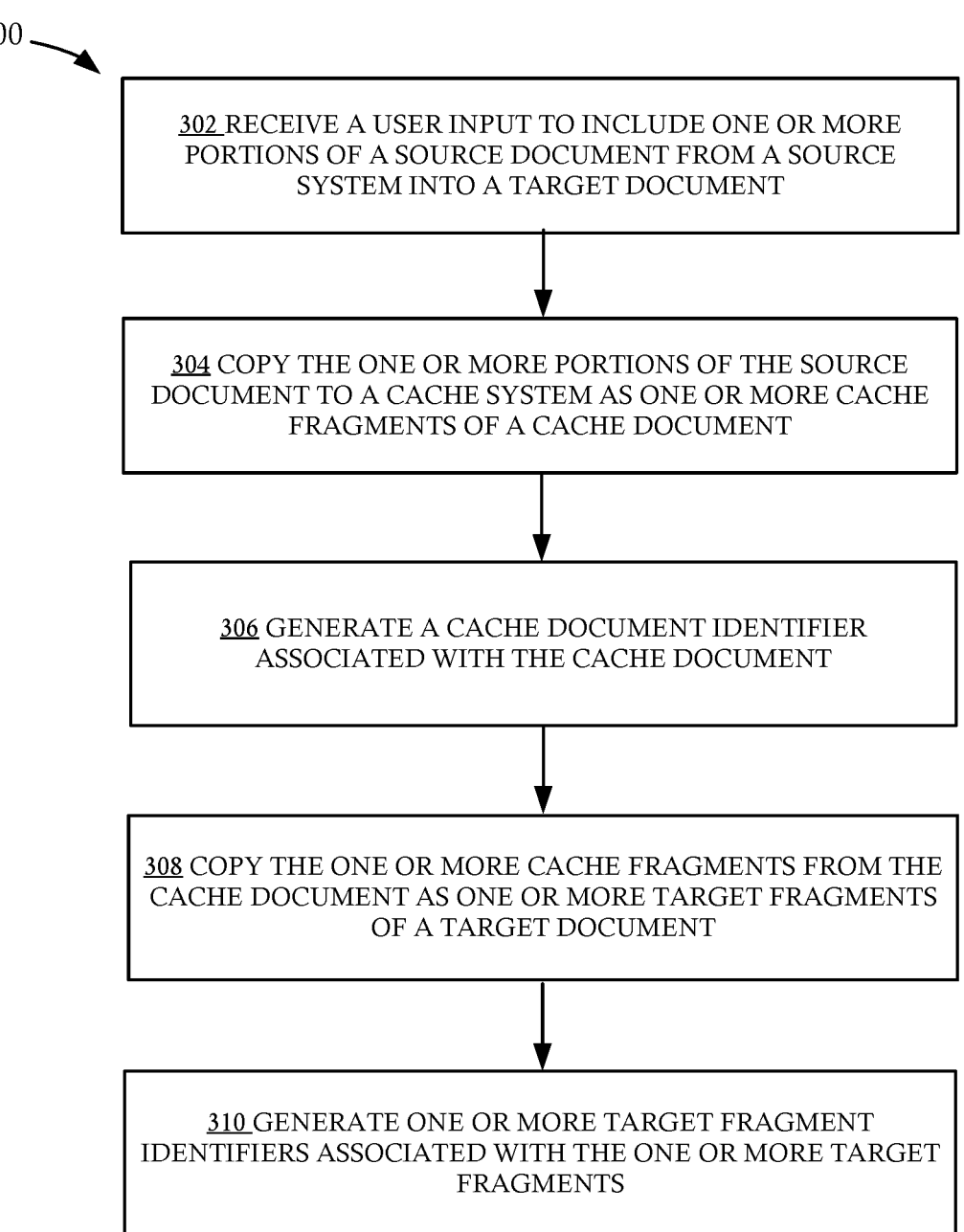

302 RECEIVE A USER INPUT TO INCLUDE ONE OR MORE PORTIONS OF A SOURCE DOCUMENT FROM A SOURCE SYSTEM INTO A TARGET DOCUMENT

304 COPY THE ONE OR MORE PORTIONS OF THE SOURCE DOCUMENT TO A CACHE SYSTEM AS ONE OR MORE CACHE FRAGMENTS OF A CACHE DOCUMENT

306 GENERATE A CACHE DOCUMENT IDENTIFIER ASSOCIATED WITH THE CACHE DOCUMENT

308 COPY THE ONE OR MORE CACHE FRAGMENTS FROM THE CACHE DOCUMENT AS ONE OR MORE TARGET FRAGMENTS OF A TARGET DOCUMENT

310 GENERATE ONE OR MORE TARGET FRAGMENT IDENTIFIERS ASSOCIATED WITH THE ONE OR MORE TARGET FRAGMENTS

FIG. 3A

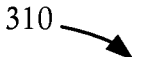

310

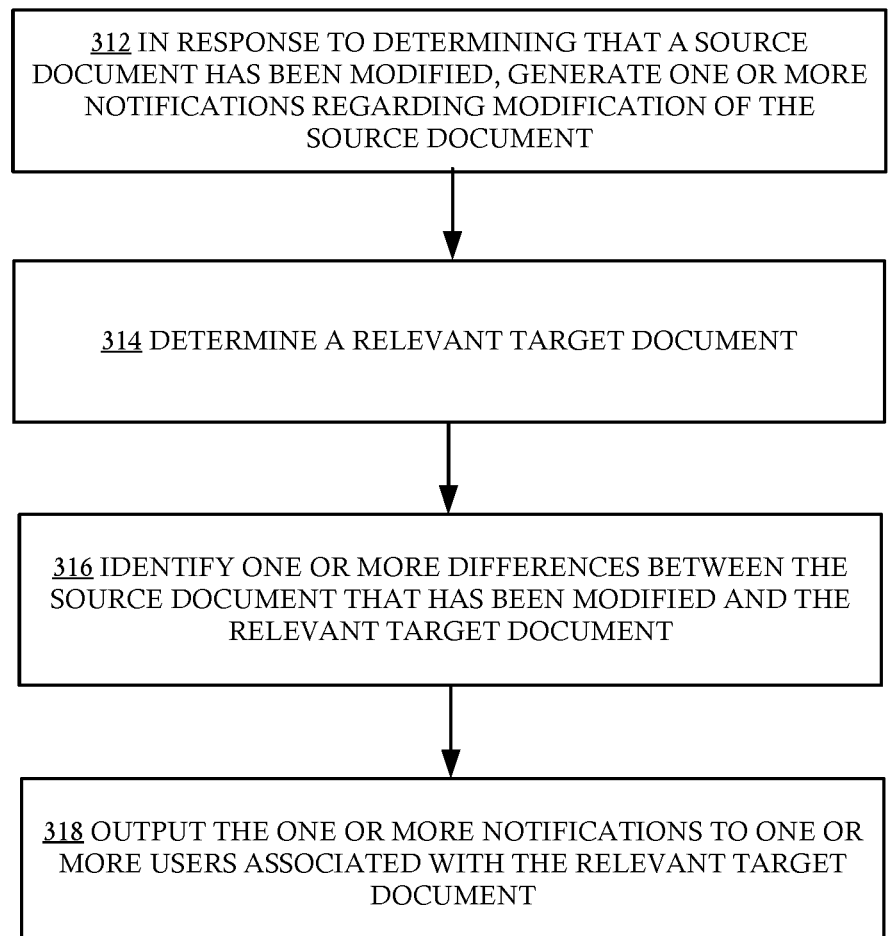

312 IN RESPONSE TO DETERMINING THAT A SOURCE DOCUMENT HAS BEEN MODIFIED, GENERATE ONE OR MORE NOTIFICATIONS REGARDING MODIFICATION OF THE SOURCE DOCUMENT

314 DETERMINE A RELEVANT TARGET DOCUMENT

316 IDENTIFY ONE OR MORE DIFFERENCES BETWEEN THE SOURCE DOCUMENT THAT HAS BEEN MODIFIED AND THE RELEVANT TARGET DOCUMENT

318 OUTPUT THE ONE OR MORE NOTIFICATIONS TO ONE OR MORE USERS ASSOCIATED WITH THE RELEVANT TARGET DOCUMENT

FIG. 3B

SYSTEMS AND METHODS FOR TRACKING DOCUMENT REUSE AND AUTOMATICALLY UPDATING DOCUMENT FRAGMENTS ACROSS ONE OR MORE PLATFORMS

TECHNICAL FIELD

This application relates generally to managing content reuse, and more particularly, to tracking and updating reused content to maintain consistency between instances of reused content across target documents.

BACKGROUND

Conventional content management methods and systems do not track when source content is reused. Instead, these conventional systems require a user to manually track when the source content has been reused in one or more target documents. In other words, these conventional systems do not associate the source content with the one or more target documents, and as such have no way to update reused source content (e.g., target content) in the one or more target documents when the source content is updated.

Additionally, even if the user is made aware that the source content has been updated, the user must manually determine which of the one or more target documents contain the reused source content and update accordingly. Consequently, the user may update some instances with the update source content and other instances may still contain the original source content. This can lead to inconsistencies between target documents that reuse the same source content (and thus should be substantively similar). This inconsistency can lead do confusion for readers of the document.

For example, in conventional methods, reusing source content includes a user copying and pasting source content from a source document to a target document, where no record is generated identifying which source content was used. Thus, conventional methods and systems do not store information regarding which source contents have been reused, and do not monitor those source contents for updates about the source contents that have been reused and instead require the user to manually track the source of the reused information and which target documents contain the reused content that need to be updated.

SUMMARY

In some embodiments, a system is disclosed. The system includes a non-transitory memory and a processor communicatively coupled to the non-transitory memory. The processor is configured to read a set of instructions to receive a user input, at a user interface, to include one or more portions of a source document from a source system into a target document. The source document may be associated with a source document identifier. The processor is further configured to copy the one or more portions of the source document as one or more cache fragments of a cache document to a cache system. The processor is further configured to generate a cache document identifier associated with the cache document. The cache document identifier may also be associated with the source document identifier. The processor is further configured to copy the one or more cache fragments from the cache document as one or more target fragments of a target document. The processor is further configured to generate one or more target fragment identifiers associated with the one or more target fragments. The one or more target fragment identifiers may be associated with the cache document identifier and/or the source document identifier.

In various embodiments, a computer implemented method is disclosed. The computer implemented method includes a step of receiving a user input, at a user interface, to include one or more portions of a source document from a source system into a target document. The source document may be associated with a source document identifier. The computer-implemented method further includes a step of copying the one or more portions of the source document as one or more cache fragments of a cache document to a cache system. The computer-implemented method further includes a step of generating a cache document identifier associated with the cache document. The cache document identifier may also be associated with the source document identifier. The computer-implemented method further includes a step of copying the one or more cache fragments from the cache document as one or more target fragments of a target document. The computer-implemented method further includes a step of generating one or more target fragment identifiers associated with the one or more target fragments. The one or more target fragment identifiers may be associated with the cache document identifier and/or the source document identifier.

In various embodiments, a non-transitory computer readable medium having instructions stored thereon is disclosed. The instructions, when executed by at least one processor, cause at least one device to perform operations including receiving a user input, at a user interface, to include one or more portions of a source document from a source system into a target document. The source document may be associated with a source document identifier. The instructions, when executed by at least one processor, cause at least one device to perform operations including copying the one or more portions of the source document as one or more cache fragments of a cache document to a cache system. The instructions, when executed by at least one processor, cause at least one device to perform operations including generating a cache document identifier associated with the cache document. The cache document identifier may also be associated with the source document identifier. The instructions, when executed by at least one processor, cause at least one device to perform operations including copying the one or more cache fragments from the cache document as one or more target fragments of a target document. The instructions, when executed by at least one processor, cause at least one device to perform operations including generating one or more target fragment identifiers associated with the one or more target fragments. The one or more target fragment identifiers may be associated with the cache document identifier and/or the source document identifier.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIGS. 3A and 3B are flowcharts illustrating a content reuse method, in accordance with some embodiments;

DETAILED DESCRIPTION

Figure 1:
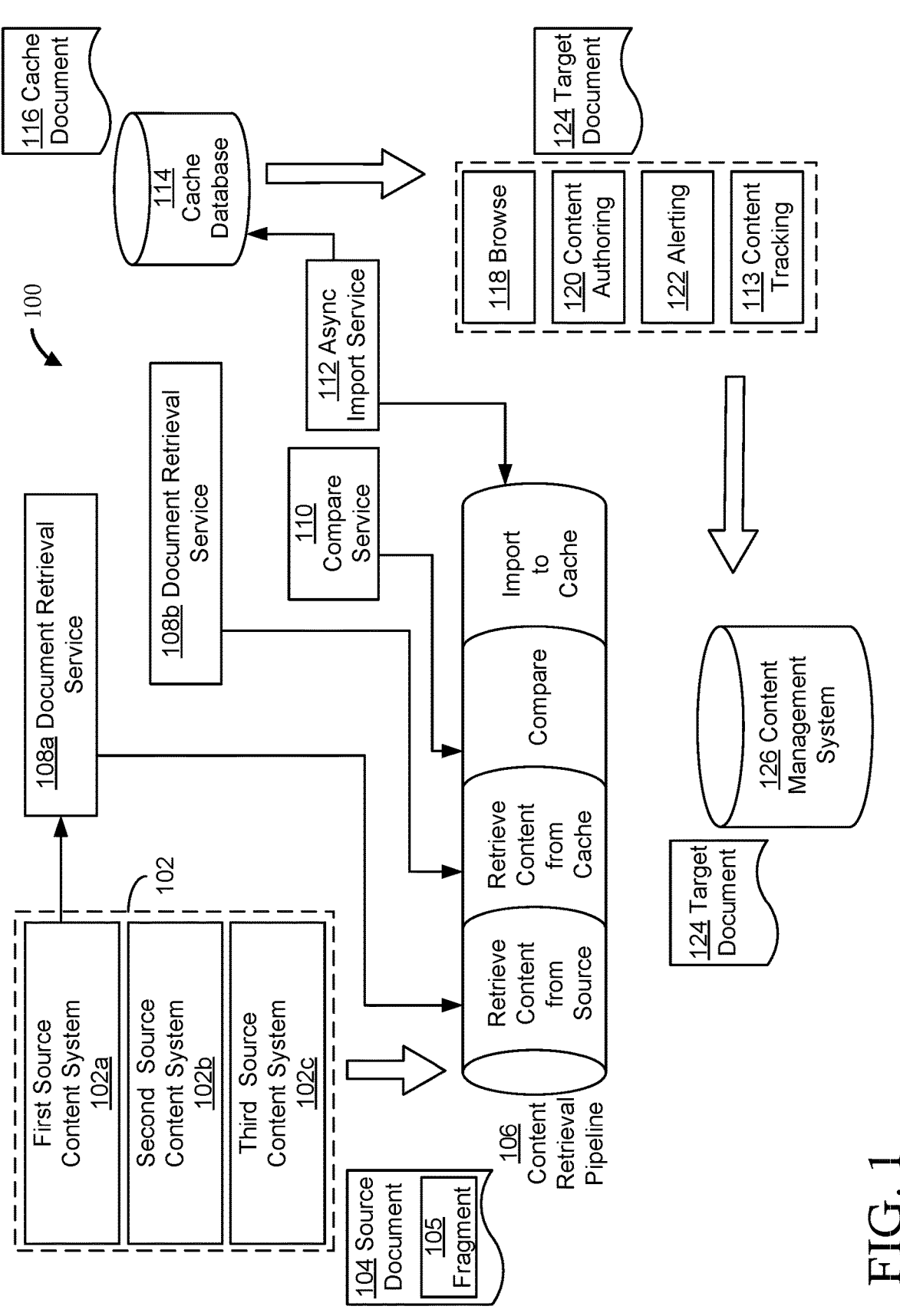
FIG. 1 is a block diagram illustrating various portions of a content reuse system configured for ingesting and processing source information for reuse in one or more target documents, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for managing content reuse. Managing content reuse may include receiving a user input at a user interface to include one or more portions of a source document from a source system into a target document. The source document may be associated with a source document identifier. The one or more portions of the source document may be copied as one or more cache fragments of a cache document to a cache system. A cache document identifier associated with the cache document may be identified. The cache document identifier may also be associated with the source document identifier. The one or more cache fragments from the cache document may be copied as one or more target fragments of a target document. One or more target fragment identifiers associated with the one or more target fragments may be generated. The one or more target fragment identifiers may be associated with the cache document identifier and/or the source document identifier.

FIG. 1 is a block diagram 100 illustrating various portions of a content reuse system configured for ingesting and processing source information for reuse in one or more target documents 124, in accordance with some embodiments. A user input may be received at a first user interface.

The user input may include instructions to browse one or more source content system(s) 102 (e.g., a first source content system 102a, a second source content system 102b, a third source content system 102c, and/or any number of source content systems or source systems, which are used herein interchangeably). In some embodiments, the source content systems 102 may include source information, such as one or more source documents 104 and/or one or more source fragments. The one or more source documents 104 may include one or more source fragments. Source fragments may include one or more snippets or portions of the source document. Source fragments may be uniquely identified by the source content system(s), where the unique identification of the source fragments may be similar to the unique identification of the source documents. For example, a plurality of source fragments, when combined, may form a source document 104. In another example, a first source document can include source fragments A and B, and a second source document can include source fragments B and C. In this example, different source documents 104 can include the same source fragment(s).

The one or more source documents 104 may include research papers, white papers, meta-analyses, procedural checklists, practice guidance, textbooks, treatises, public records, articles, academic journals, and/or other written or illustrated works. The one or more source documents 104 may include metadata regarding the source documents 104. For example, the metadata may include which source content system 102 a source document 104 originated from, when a source document 104 was last updated, the revision history of a source document 104, citations associated with a source document 104, or other information related to a source document 104. Similarly, the one or more source fragments may include metadata regarding the source fragments. For example, the metadata may include which source content system 102 a source fragment originated from, when a source fragment was last updated, the revision history of a source fragment, citations associated with a source fragment, fragment type (e.g., brief description, diagnosis, conditions, etc.), or other information related to a source fragment.

In some embodiments, when a source document 104 is not further subdivided into one or more source fragments 105, the metadata includes information regarding the source document 104. As another example, when the source document 104 does not include one or more source fragments 105, the metadata does not include information regarding any source fragments 105. When a source document 104 includes at least one source fragment, the metadata may include information regarding the source fragment and/or the source document 104. When a source document 104 includes a plurality of source fragments 105, the metadata may include information regarding some or all of the source fragments 105. For example, the metadata may not include all the information regarding all source fragments 105 within the source document 104, such as only including the information regarding source fragments 105 that have been reused (as explained in further detail below). It will be appreciated that the metadata may include identifiers for a smallest possible division of a source, such as a source document and/or a source fragment, indexed by a source system.

In some embodiments, the source information (e.g., source content, source documents 104, source fragments 105, source metadata, or other data stored on source systems), is ingested by a content retrieval pipeline 106. The source information may be ingested by the content retrieval pipeline 106 in response to a user input to reuse the source information. For example, a user may provide a user input to reuse a source document 104 or a source fragment. The user input to reuse a source document 104 or a source fragment may include an express command to reuse the source document (e.g., user input may be received at a "reuse content" button), or may include a related command such as copying some or all of the source document 104 or having the source document 104 open while authoring a target document.

In some embodiments, source information is provided to a content retrieval pipeline via a document retrieval service 108*a*. Cache information may be provided to a content retrieval pipeline 106 via a document retrieval service 108*b*. In some embodiments, document retrieval service 108*a* for source systems and document retrieval service 108*b* for cache systems may be the same and/or interchangeable. For example, a single document retrieval service may handle information, document, and/or fragment retrieval from respective systems (e.g., source systems and/or cache systems). In some embodiments, the document retrieval service obtains an entire source document when either a source document or a fragment associated with a source document is selected. The document retrieval service may generate a copy of a source document, a stream of the source document from a document source, and/or any other suitable process for obtaining data associated with the source document.

In some embodiments, a source document 104 may be retrieved using a document retrieval service 108*a*. The retrieved source document 104 may be output to a user. In some embodiments, a cache document 116 may be retrieved using a document retrieval service 108*b*. The retrieved cache document 116 may be based similarity to the source document 104. For example, a cache document may be retrieved when similarity between the cache document and the source document meet a similarity threshold. The comparison may be performed by compare service 110 (discussed below). The retrieved cache document 116 may be output to a user. In some embodiments, the cache document 116 may be output to a user instead of source document 104 based on the comparison performed by compare service 110. For example, when a cache document 116 that is the same as source document 104 is available, and the user requests source document 104, cache document 116 may be presented to the user instead. In another example, when reusing content in another document (e.g., a target document, which is discussed in greater detail below), the origin of the reused content may be from the cache document 116 instead of the source document 104. In this example, metadata or information may link the cache document 116 to the source document 104. Outputting and reusing content from the cache document 116 may increase the speed and efficiency of the content reuse system. For example, the cache document 116 may reduce the need to query the source content system when multiple cached documents are linked together. In this example, a first cached document (accessed when it is the same as a first source document) may link to a second cache document of a second source document. When the user requests the second source document, instead of requesting the second source document from the source content systems 102 (which may be a third-party system), the second cache document is instead retrieved and output to the user. This may be quicker and more efficient because the cache database 114 may be a first-party system and may be better integrated into the content reuse system.

In some embodiments, a compare service 110 is configured to compare differences between a source document 104 and a cache document 116. In response to no differences, or differences not meeting a difference threshold, between the source document 104 and the cache document 116, the compare service 110 may output the cache document 116 in place of source document 104 to the user. In response to one or more differences meeting a difference threshold between the source document 104 and the cache document 116 the compare service may call the async import service 112 to cache the source document 104 as a new cache document. The difference threshold may be adjusted based on the metadata associated with the source document 104. The metadata may include a subject matter (e.g., law, health, automotive, etc.) and information regarding which section or chapter (e.g., preface, bibliography, substantive sections, etc.).

In some embodiments, a compare service 110 is configured to compare differences between updated source information (e.g., new source information, a later version of the source information) from a source content system 102 and the previous version of the source information (e.g., old source information, the last retrieved version of the source information and/or the original version of the source information). Source information may include source content, source documents 104, source fragments 105, source metadata, or other data stored on source systems 102. The comparison may be used to alert a user that the content has changed. The comparison may also be used to assist a user in resolving changes between a new version of the source information versus the old version of the source information.

In some embodiments, an asynchronous import service 112 may cache source information (e.g., source document 104) in a cache database 114. The asynchronous import service 112 may be triggered when a user attempts to reuse information from a source document that is not already in the cache database 114. For example, when a user copies a source fragment to a target document, and that source fragment is not already in the cache database 114, the asynchronous import service 112 caches the source fragment. Generally, the asynchronous import service 112 may include any service that stores a copy of the source information in a different database. Caching source information may improve the speed and efficiency of the content reuse system. Furthermore, caching the source information may provide a snapshot to compare updates to the source information when updated at the source systems 102. This may be useful if the source systems 102 do not maintain revision history. The copied, stored, or otherwise cached source information may be stored as cache information (e.g., cache document 116) in a cache database 114. A cache document 116 may include some or all of the information in the source document 104. A cache document 116 may only include portions of the source information that the user reuses in a target document (discussed in more detail below). The cache document 116 may include portions of the source information that the user viewed.

In some embodiments, the cache document 116 may include information to link and/or reference the information and/or content contained within the cache document 116 as associated with the source document 104 from which the information and/or content was reused.

In some embodiments, a user may browse 118 source systems 102, one or more cache databases 114, and/or content management systems 126. The content management system may include one or more target documents 124. Browsing 118 may include outputting content stored in the source systems 102, one or more cache databases 114, and/or content management systems 126. Browsing may also include viewing relationships between documents, including where content is reused. For example, browsing 118 may include viewing all documents linked by a specified reused content. In another example, browsing 118 may include viewing, in a specified target document, all reused contents and associated source(s).

In some embodiments, the content management system 126 stores one or more target documents 124. The content management system 126 may also include one or more editors and/or browsers to facilitate content creation and/or content authoring. For example, the content management system 126 may store the metadata for linking the source document 104, the cache document 116, and/or the target document 124. As another example, in some embodiments, the content management system 126 facilitates content authoring 120 to generate additional content, such as one or more additional source documents, source fragments, etc. Content authoring 120 may include reusing content from source document 104. For example, content authoring 120 may include copying and pasting a portion of source document 104 into a target document 124. Content authoring 120 may also include writing new content (e.g., content that is not the same as in source document 104). This new content may include information from source content 104, but may be rewritten by a user (e.g., an author). Content authoring may also include editing or formatting the content in a target document 124.

In some embodiments, content management system 126 may alert 122 a user when there is a change or update to source information (e.g., source content, source documents 104, source fragments 105, source metadata, or other data stored on source systems). For example, in some embodiments, the generation of an alert 122 may be initiated by a future update detected by and/or identified by a content tracker 113 configured to detect changes to elements within the cache database 114, such as, for example, an update to any document in source systems 102, an update to a specific document in source systems 102 (e.g., a source document 104 that has been linked to or referenced by a cache document or a target document), an update to specified documents that are flagged (e.g., flagged for monitoring), an update to a source fragment, and/or an update to a specified subject matter. The alert 122 may be output to a user. In response to the alert 122, a user may resolve (e.g., merge and/or replace) a portion of the target document with the updated information or decline to update the portion of the target document. In some embodiments, content management system 126 may automatically update (e.g., without further input from a user) an associated portion of a target document when there is a change or update to source information (e.g., source content, source documents 104, source fragments 105, source metadata, or other data stored on source systems). An alert regarding completion of the automatic update may be generated and outputted to a user. The alert may allow the user to revert the changes made by the automatic update operation.

Figure 2:
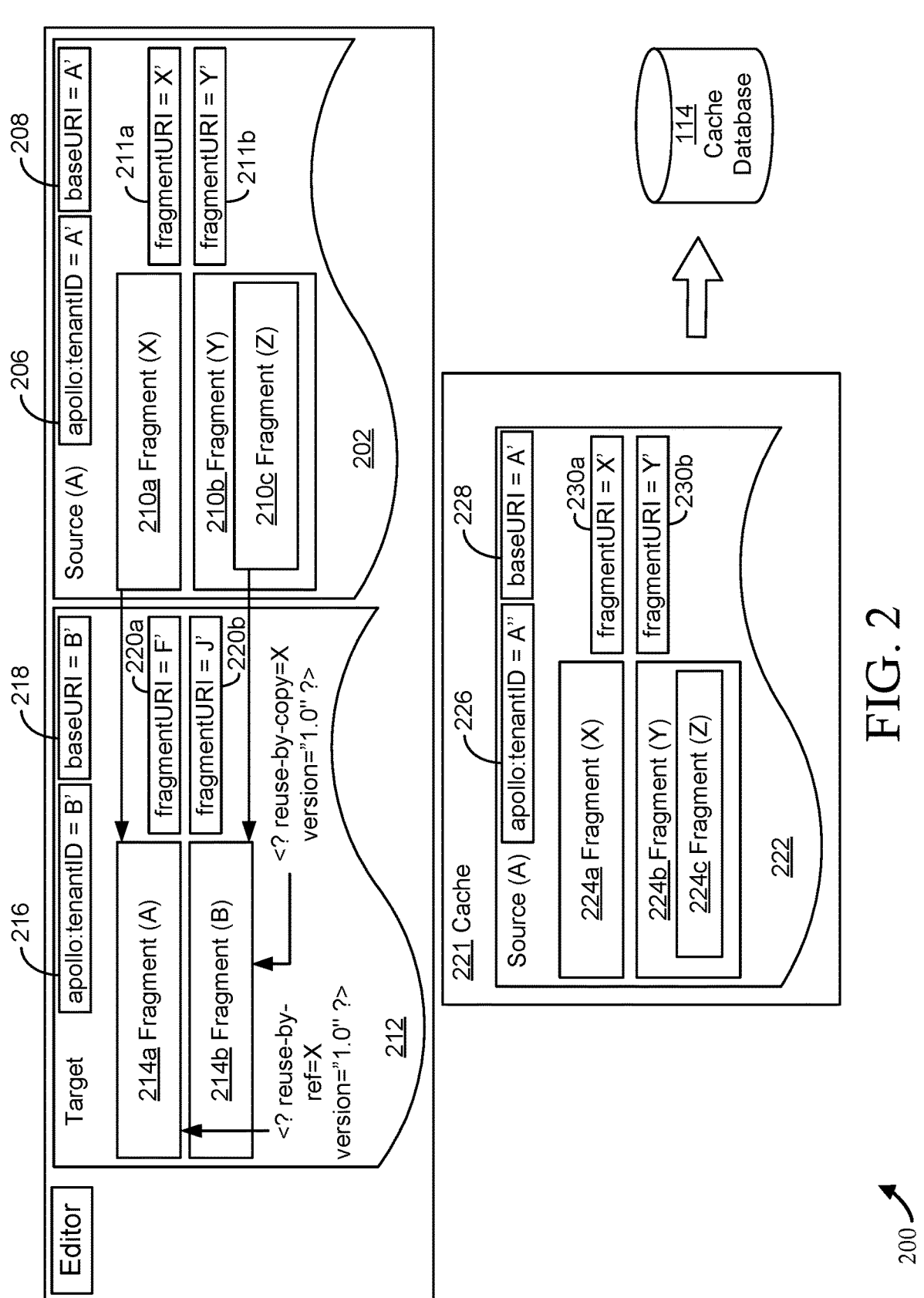
FIG. 2 is a block diagram illustrating various portions of a content reuse system including one or more reused fragments linked with one or more source fragments and/or one or more cached fragments, in accordance with some embodiments.

FIG. 2 is a block diagram illustrating various portions of a content reuse system 200 including one or more reused fragments linked with one or more source fragments and/or one or more cached fragments, in accordance with some embodiments. In some embodiments, a source document 202 includes one or more source fragments 210 (e.g., Fragment (X) 210a, Fragment (Y) 210b, and Fragment (Z) 210c and associated metadata. The source document 202 may include more or less fragments than shown in FIG. 2. In the illustrated embodiment, Fragment (Z) 210c is a portion of Fragment (Y) 210b. Generally speaking, the source document 202 may include any number of source fragments 210, and each of those source fragments 210 may recursively include any number of source fragments 210. Source fragments 210 may include one or more sections, pages, paragraphs, sentences, and/or other collections of text. Source fragments 210 may also include images, graphs, charts, and/or other media that can be incorporated into a target document 210 or otherwise reused in a document other than the source document.

In some embodiments, the source metadata includes a source tenant identifier (ID) 206 and/or a source Uniform Resource Identifier ("URI") 208. Each of the source tenant ID 206 and the source URI 208 may be provided to accommodate source documents that allow embedding identifiers inside a document and/or documents that do not allow embedding within the document. A source tenant ID 206 may be unique and may be tracked by the source system. In some embodiments, each of the source documents 202 may have unique source URIs 208. These unique source URIs 208 may be embedded inside a source document itself. The source metadata further includes one or more source fragment identifiers 211 (e.g., FragmentURI=X' 211a, and FragmentURI=Y' 211b). Each source fragment 210 may be associated with a fragment-level URI. In other words, each source fragment 210 may include a unique identifier. The source fragments 210 may also be associated with the source using source metadata related to the source tenant ID 206 and/or the source URI 208.

In some embodiments, a target document 212 includes one or more target fragments 214 (e.g., Fragment (A) 214a and Fragment (B) 214b) and associated metadata. The target document 212 may include more or less fragments than shown in FIG. 2. In the illustrated embodiment, Fragment (A) 214a includes reused content from Fragment (X) 210a of source document 202. Generally speaking, the target document 212 may include any number of target fragments 214, and each of those target fragments 214 may recursively include any number of target fragments 214. Target fragments 214 may include one or more sections, pages, paragraphs, sentences, and/or other collections of text. Target fragments 214 may also include images, graphs, charts, and/or other media that has been incorporated into a target document 210 from a source document 202.

The target metadata may include a target tenant ID 216 and/or a target Uniform Resource Identifier ("URI") 218. The target tenant ID 216 may be unique and may be tracked by the content management system In some embodiments, each of the target documents 212 may have unique target URIs 218. The target metadata may further include one or more target fragment identifiers (e.g., FragmentURI=F' 220a, and FragmentURI=J' 220b). Each target fragment 214 may be associated with a fragment-level URI 220. In other words, each target fragment 214 may include a unique identifier. The target fragments 214 may also be associated with the target using target metadata related to the target tenant ID 216 and/or the source URI 218.

In some embodiments, source content is reused by reference. For example, Fragment (A) 214a in target document 212 is a reuse by reference of Fragment (X) 210a in source document 202. In this example, Fragment (X) has been reused by reference because no modifications have been made between the same fragment in the source document 202 and the target document 212. In some embodiments, a fragment that has been reused by reference may not be edited. A fragment that has been reused by reference may be updated when there is an update to the underlying source fragment 210 and/or when there is an update to the source document 202 including the source fragment 210.

In some embodiments, the source content is reused by copy. For example, Fragment 214b in the target document 212 is a reuse by copy of Fragment 210c in the source document 202. In this example, Fragment 214b is a reuse by copy because a user can edit or modify Fragment 214b in target document 212. In some embodiments, a fragment that has been reused by copy is the same between the fragment in the source document 202 and the fragment in the target document 212.

In some embodiments, and as discussed with reference to FIG. 1, instead of reuse from the source, reuse may occur from a cache 221. The cache 221 may store one or more source fragments 210 as cache fragments 224 (e.g., Fragment (X) 224a, Fragment (Y) 224b, and Fragment (Z) 224c). The cache 221 may also store the source document 202 as a cache document 222. Like the source content, the cache content may include metadata. The metadata may include a cache tenant identifier 226 and/or a cache Uniform Resource Identifier ("URI") 228. In this example, each of the cache documents 222 may have unique cache URIs 228. The cache metadata further includes one or more cache fragment identifiers 230 (e.g., FragmentURI=X' 230a, and FragmentURI=Y' 230b). Each cache fragment 224 may be associated with a fragment-level URI. In other words, each cache fragment 224 may include a unique identifier. The cache fragments 224 may also be associated with the source document 202 such that the content reuse system 200 keeps track of which cached content 222 is associated with which source content 202.

In some embodiments, when cached content is modified, a new version of the cached content is generated and stored in the cache system (e.g., a cache database 114). In other words, in some embodiments, each time a cache fragment is modified, a new version of that cache fragment is generated and stored in the cache system, where the cache fragment ID may remain the same, a new cache fragment ID may be generated and linked to the previous cache fragment ID, or the cache fragment ID may remain the same with additional metadata storing information regarding the new version (e.g., from version 1.0 to 2.0). The cache content may be modified when the source content is updated and/or modified or when a user modifies the reused content (e.g., cached content) to integrate into the target document (e.g., reuse by copy). For example, an author may change the tense usage in the reused content to match the tense usage in the rest of the target document. This modified cache content may be reused as-is (e.g., in the same way the original cached content and/or the source content is reused). In another example, a user may modify a cache fragment 224a to include additional information that was not provided in the source fragment 210a and the modified cache fragment 224a may be cached in the cache database 114 and may be reused in one or more additional target documents. The modified cache fragment 224a can itself be further modified. These further modifications may cause it to be stored as a further modified cache fragment.

In some embodiments, the underlying data structure is a graph. The source document, the cache document, the one or more cache fragments, the one or more target fragments, and/or the target document may be one or more nodes of the graph data structure. The source document identifier, the cache document identifier, and/or the target fragment identifier are one or more edges of the graph data structure. The one or more edges may connect the one or more nodes. For example, the source document identifier and the target document identifier may connect the source document to the target document and vise versa. The graph may function as part of and/or in conjunction with a content tracker 113 to provide content update detection and/or alerting. For example, in some embodiments, the content tracker 113 may be configured to detect changes in one or more nodes in a graph corresponding to changes in one or more source documents, cache documents, and/or target documents.

FIG. 3A is a flowchart illustrating a content reuse method 300, in accordance with some embodiments. At step 302, a user input is received to include one or more portions of a source document (herein referred to interchangeably with "portion(s) of a source document" "or "portion(s) of the source document") from a source system into a target document. The user input may be received at a user interface.

In some embodiments, including the portion(s) of the source document from the source system can include referencing the portion(s) of the source document in the target document (e.g., incorporation by reference). For example, the target document may link to portion(s) of the source document in the target document such that when the target document is viewed by a user, the target document includes the portion(s) of the source document in the target document. When a reference to a source document and/or a source fragment is included in a document, the portion(s) of the source document referenced may be duplicated (e.g., copy and pasted) into the target document without changes when the target document is viewed, for example, by a user. The current version of the source document and/or the source fragment may be included in the target document at the reference location when the target document is opened by the user.

In some embodiments, incorporation by reference may operate on portion(s) of the source document directly and/or may operate on cached version(s) of portion(s) of the source document (explained in further detail below). For example, a content reuse system may copy and paste directly from a source document to a target document. In another example, a content reuse system may copy and paste from a source document to a target document by first creating a cache version of the source document (herein referred to interchangeably with "cache document") and a cache version of the portion(s) of the source document (herein referred to interchangeably with "cache fragments"). In this example, the target document contains information stored in the cache document, which may be the same as the information stored in the source document. The target document may include the cache fragments (e.g., via copy and paste operations, or a reference and/or link to the cache fragments).

In some embodiments, including the portion(s) of the source document from the source system may include copying and pasting the portion(s) of the source document directly into the target document. In this example, the reused portion(s) may be edited or otherwise modified such that the reused portion(s) are distinct from the portion(s) of the source document. The reused portion(s) may be modified to include additional information that was not included in the associated portion(s) of the source document, or may be modified to integrate with the target document (e.g., to match the style, flow, and/or grammar of the target document). The modification may occur at a user interface (e.g., an editor interface).

In some embodiments, a content reuse system may have read and/or write access, (e.g., read and write access, read-only access, etc.) to one or more source systems. For example, the content reuse system may copy one or more source fragments, source documents, and/or other source information from a source system. Source systems may include, but are not limited to, first-party systems and/or third-party systems. Third-party systems may be administered by parties other than the provider of the content reuse system. Cached content may be particularly advantageous when the content originates from a third-party system because the cached content may operate as an archived version of what was available at the time of retrieval.

At step 304, one or more portions of a source document are copied to the cache system as one or more cache fragments of a cache document. In some embodiments, one or more portions of the source document are copied to the cache system in response to the one or more portions of the source document being copied to and/or referenced in a target document. For example, when a user copies a portion of a source document to a target document, a cache document may be created with at least the portion of the source document that was copied to the target document. The cache copy may include additional portions of the source document (e.g., additional cache fragments) and/or the entirety of the source document.

At step 306, a cache document identifier associated with the cache document is generated. In some embodiments, the cache document identifier links the cache document and/or cache fragments with the source document and/or source fragments. The cache document identifier may uniquely identify the cache document. If the source document and/or fragments of source document (which may be cached earlier, because of previous reuse) is modified, the modified cache document may be automatically generated by content reuse system and stored in the cache system and a new associated cache document identifier may be generated for the modified cache document. The new cache document identifier may be the same as the original cache document identifier with additional information regarding a new version and/or that the modified cache document is different from the associated source document. The new cache document identifier may be different from the original cache document identifier and is associated with (e.g., links back to) the original cache document identifier.

At step 308, one or more cache fragments from the cache document are inserted into a target document as one or more target fragments. The cache fragments may be copied as read-only or may be write enabled to allow a user to edit the contents of the target document. Edited cache fragments remain associated with the source document unless a user expressly removes the connection. When the source document is updated, the edited cache fragments will be updated based on alerting notifications and subsequent actions a user makes to incorporate the updated source document into the target document. For example, if the user declines to edit the target document with the updated information, the edited cache fragment stays the same and may include additional version information to indicate that the updated source information was not incorporated. In another example, if the user accepts the updated information without modification (e.g., read-only), the target fragment may now link to revised cache fragment. The revised cache fragment and a previous cache fragment may have a linkage between them tracked by the system. Other target documents that may be using previous cache fragment may continue to function until alerting notifications are resolved by a user. In yet another example, if the user edits the target document, but does not accept the updated information in its entirety, the edited target fragment may be updated with the updated information and the user's edits made in the target document. The updated target document fragment may continue to have linkage with revised cache fragment to reflect that updated target document fragment is edited version of revised cached fragment.

At step 310, one or more target fragment identifiers associated with the one or more target fragments are generated. In some embodiments, the target document identifier links the target document and/or target fragments with the source document and/or source fragments. The target identifier may further link the target document and/or target fragments with the cache document and/or cache fragments. Additionally, the target document identifier may link the target metadata, source metadata, and cache metadata such that all three are linked together. The target document identifier may uniquely identify the target document. If the target document is modified, the modified target document may be stored in the target system and a new associated target document identifier may be generated for the modified target document. The new target document identifier may include an updated version field of the target document.

In some embodiments, the target document may be reverted to a previous version of the target document based on the original target document identifier. For example, the new target document identifier may link back to the immediately preceding target document identifier. In this example, upon reversion, the new target document is replaced with the previous target document. This can be advantageous when a user wants to roll back changes (e.g., when an update to the source is erroneous).

FIG. 3B is a flowchart illustrating a content reuse method 300, in accordance with some embodiments. At step 312, in response to determining that a source document has been modified, generate revised cache fragment and generate one or more notifications regarding modification of the source document. These one or more notifications may be displayed at the user interface, pushed as notifications, sent as an email, or otherwise provided to the user to alert the user regarding a modification of the source document.

At step 314, a relevant target document may be determined based on one or more identifiers as discussed with respect to FIG. 2. For example, a relevant target document may be identified by starting with the source identifier associated with the updated source document or source fragment (e.g., fragmentURI 211). The source identifier may be associated with a cache identifier, which may be associated with the target identifier. In this way, based on the source identifier, the target identifier and the relevant target document may be identified. Target documents that do not share any association with the updated source document identifier may be considered not relevant.

At step 316, identify one or more differences between the source document that has been modified and the relevant target document. Difference can include differences in the text, figures, formatting, metadata or other changes between the updated source document and the target document. In some embodiments, differences regarding content that was expressly removed by the user may not be identified. For example, if a user only uses a sentence in a source document, the content reuse system may only output differences associated with that sentence and not changes made in other portions in the source document. Those other differences may be identified and categorized in a different way to alert the user regarding the change, but does not directly impact the content used in the target document.

At step 318, output the one or more notifications to one or more users associated with the relevant target document. The notification may present to the one or more users an option to incorporate all the updates (e.g., differences) between the source document that has been modified and the relevant target document. The notification may present to the one or more users an option to edit and select which differences between the documents to keep at the user interface. For example, the user may incorporate factual portions of the updated source document but not the editorial or opinion portions of the updated source document.

In some embodiments, the user interface includes a first region and a second region. The first region may include the source document that has been modified. The second region may include the relevant target document with one or more annotations showing the one or more differences between the source document that has been modified and the relevant target document. In this way, the user can see the context for both the source document and the relevant target document. In some embodiments, the original source document may be displayed in a third region in addition to, and distinct from, the first and the second regions.

Figure 4:
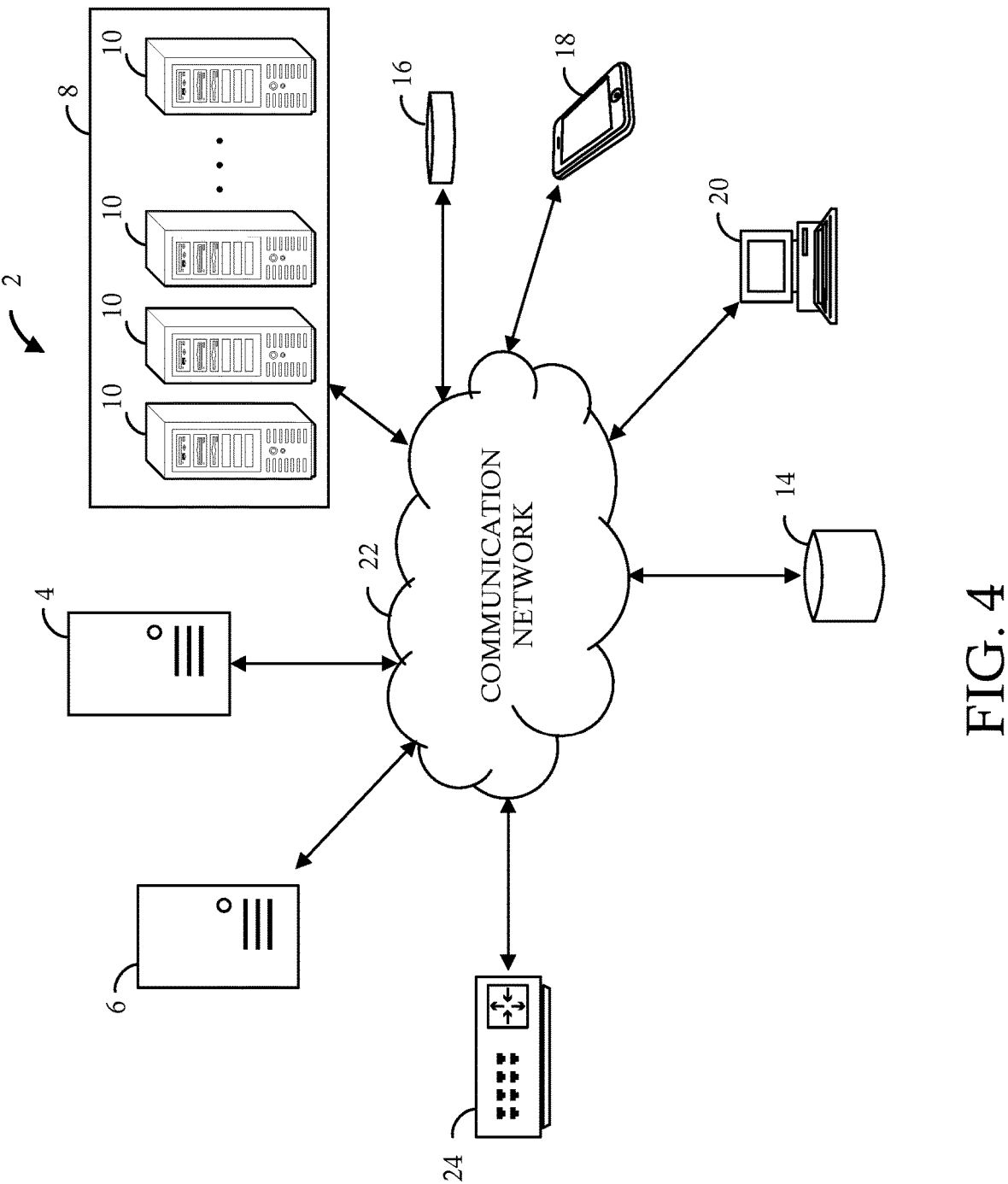
FIG. 4 illustrates a network environment configured to manage content reuse, in accordance with some embodiments.

FIG. 4 illustrates a network environment 2 configured to manage content reuse, in accordance with some embodiments. The network environment 2 includes a plurality of devices or systems configured to communicate over one or more network channels, illustrated as a network cloud 22. For example, in various embodiments, the network environment 2 may include, but is not limited to, content reuse management device(s) 4, a web server 6, a cloud-based engine 8 including one or more processing devices 10, a database 14, and/or one or more user computing devices 16, 18, 20 operatively coupled over the network 22. The content reuse management device(s) 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the content reuse management device(s) 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the content reuse management device(s) 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the content reuse management device(s) 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

Although FIG. 4 illustrates three user computing devices 16, 18, 20, the network environment 2 may include any number of user computing devices 16, 18, 20. Similarly, the network environment 2 may include any number of the content reuse management device(s) 4, the web server 6, the processing devices 10, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the content reuse management device(s) 4, the web server 6, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as a content reuse management website, hosted by the web server 6. The website may capture these activities as user session data, and transmit the user session data to the content reuse management device(s) 4 over the communication network 22. For example, a user may operate one of the user computing devices 16, 18, 20 to initiate a web browser that is directed to the website hosted by the web server 6. The user may, via the web browser, perform various operations such as searching for source document(s), copying and pasting content between a source document and a target document, responding to an alert that a source document that contains content that has been reused in a target document has been updated, resolving conflicts between the original reused content in a target document and the updated source content that is associated with the reused content, and/or other operations for managing reused content, etc. The website may also allow the user to interact with one or more of interface elements to perform specific operations, such as selecting one or more elements for further processing. In some embodiments, the web server 6 transmits user interaction data identifying interactions between the user and the website to the content reuse management device(s) 4.

In some embodiments, the content reuse management device(s) 4 may execute one or more models, processes, or algorithms, such as a machine learning model, deep learning model, statistical model, etc., to perform content reuse management. The content reuse management device(s) 4 may transmit an output associated with the user input, including at least a target document with or without reused content from a source document and/or, to the web server 6 over the communication network 22, and the web server 6 may display interface elements associated with the output to the user input on the website to the user. For example, the web server 6 may display interface elements associated with the content reuse system and the output to the user input to the user on a content management interface configured for the user to search, edit, and reuse content between one or more documents.

The content reuse management device(s) 4 is further operable to communicate with the database 14 over the communication network 22. For example, the content reuse management device(s) 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the content reuse management device(s) 4, in some embodiments, the database 14 may be a local storage device, such as a hard drive, a non-volatile memory, or a USB stick. The content reuse management device(s) 4 may store interaction data received from the web server 6 in the database 14. The content reuse management device(s) 4 may also receive from the web server 6 user session data identifying events associated with browsing sessions, and may store the user session data in the database 14.

In some embodiments, the content reuse management device(s) 4 generates training data for a plurality of models (e.g., machine learning models, deep learning models, statistical models, algorithms, etc.) based on source information (e.g., source content, source documents, source fragments, source metadata, or other data stored on source systems), target information (e.g., target content, target documents, target fragments, target metadata, or other data stored on target systems), cache information (e.g., cache content, cache documents, cache fragments, cache metadata, or other data stored on cache systems), and/or user inputs, etc. The content reuse management device(s) 4 and/or one or more of the processing devices 10 may train one or more models based on corresponding training data, which may include source information, target information, cache information, and/or user inputs. The content reuse management device(s) 4 may store the models in a database, such as in the database 14 (e.g., a cloud storage database).

In some embodiments, the content reuse management device(s) 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, the content reuse management device(s) 4 may manage reused content and content associated with, or similar to, the reused content.

Figure 5:
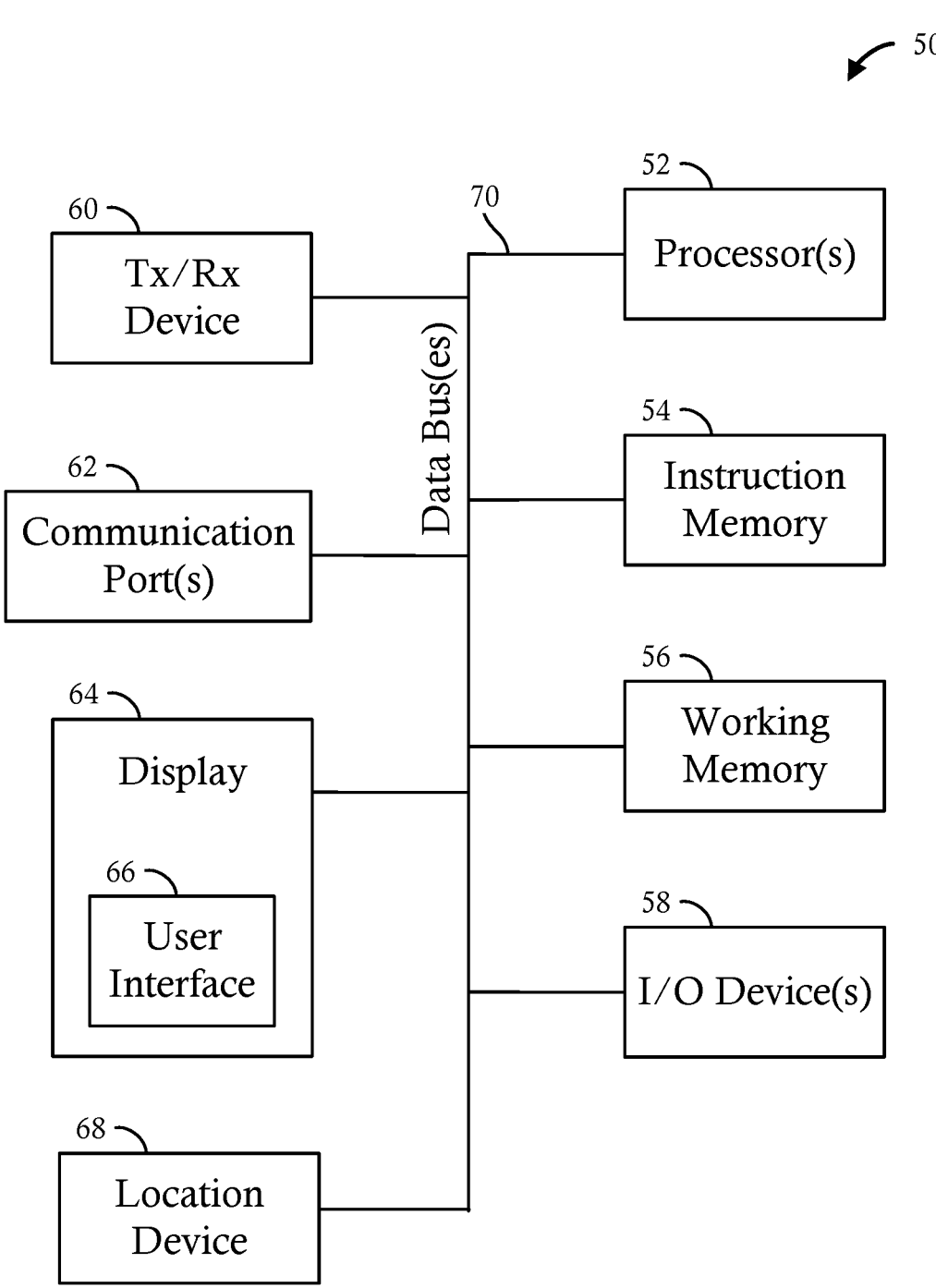
FIG. 5 illustrates block diagram of a computer device configured to implement one or more processes, in accordance with some embodiments.

FIG. 5 illustrates a block diagram of a computing device 50 configured to implement one or more processes, in accordance with some embodiments. In some embodiments, each of the content reuse management device(s) 4, the web server 6, the one or more processing devices 10, the workstation(s) 12, and/or the user computing devices 16, 18, 20 in FIG. 4 may include the features shown in FIG. 5. Although FIG. 5 is described with respect to certain components shown therein, it will be appreciated that the elements of the computing device 50 may be combined, omitted, and/or replicated. In addition, it will be appreciated that additional elements other than those illustrated in FIG. 5 may be added to the computing device.

As shown in FIG. 5, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for generating personalized study plans, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 4. For example, if the communication network 22 of FIG. 4 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 4, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data, source information (e.g., source content, source documents, source fragments, source metadata, or other data stored on source systems), target information (e.g., target content, target documents, target fragments, target metadata, or other data stored on target systems), and/cache information (e.g., cache content, cache documents, cache fragments, cache metadata, or other data stored on cache systems).

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display and may display the user interface 66. The user interfaces 66 may enable user interaction with the content reuse management system, information associated with a user input, source information (e.g., source content, source documents, source fragments, source metadata, or other data stored on source systems), target information (e.g., target content, target documents, target fragments, target metadata, or other data stored on target systems), and/or cache information (e.g., cache content, cache documents, cache fragments, cache metadata, or other data stored on cache systems). For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Managing reused content may be burdensome and time consuming for a user, especially when conventional systems do not track or link the reused content with the source content. In other words, in conventional systems, the user must manually manage every instance of reused content. This can lead to inconsistencies between instances of the same reused content when some reused content has been updated with new information from updated source content, but other reused content has not been updated (e.g., still contains information from the previous version of the source content). This inconsistency can lead to confusion to consumers of target content with the different reused information. For example, a particular practice guidance may be included in both a frequently-asked-questions document and a practice-specific document. In this example, a user may be confused if the practice guidance recommends one course of action in the frequently-asked-questions document, but the practice-specific document recommends a different course of action.

As disclosed herein, a content reuse system may link the reused content with the source content, thereby significantly reducing the aforementioned problem with conventional systems. Linking (or otherwise creating a reference between the reused content and the source content) can reduce the burden on the user because the user is no longer required to remember or document instances where source content has been reused. The content reuse system further reduces this problem by monitoring the source for changes to the source content that is associated with reused content. Furthermore the content reuse system may alert a user to changes to the source content, and/or updating the reused content with the source content with the updated source content. Thus, the content reuse system simplifies monitoring and updating reused data for consistency between target content.

Although the methods described above are with reference to the illustrated flowcharts, it will be appreciated that many other ways of performing the acts associated with the methods may be used. For example, the order of some operations may be changed, and some of the operations described may be optional.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits.

Although the subject matter has been described in terms of exemplary embodiments, it is not limited thereto. Rather, the appended claims should be construed broadly, to include other variants and embodiments, which may be made by those skilled in the art.

What is claimed is:

1. A system for tracking document reuse and automatically updating document fragments across one or more platforms via a cache system, comprising:

a non-transitory memory;

a processor communicatively coupled to the non-transitory memory, wherein the processor is configured to read a set of instructions to:

receive, at a user interface, a user input to incorporate by reference one or more portions, that are less than all, of a source document into a target document, wherein the source document is associated with a source document identifier;

compare the one or more portions of the source document with one or more cache fragments of a cache document;

in accordance with a determination that at least a portion of the one or more portions of the source document does not match any of the one or more cache fragments, cache the portion of the one or more portions of the source document as a cache fragment of the one or more cache fragments of the cache document, wherein a cache document identifier is associated with the cache document and the source document identifier;

generate, based on the one or more portions of the source document to be incorporated by reference, the target document including one or more target fragments that include the one or more cache fragments;

generate one or more target fragment identifiers associated with the one or more target fragments and also associated with the cache document identifier, the source document identifier, or both the cache document identifier and the source document identifier; and in accordance with a determination that at least one of the one or more portions of the source document has been modified, update, based on the one or more target fragment identifiers associated with the modified source document, the one or more portions of the source document that are incorporated by reference into the target document.

2. The system of claim 1, wherein the one or more portions of the source document include one or more source fragments, wherein the source fragments are associated with one or more source fragment identifiers.

3. The system of claim 2, wherein generating the cache document includes copying the one or more source fragments of the source document as the one or more cache fragments of the cache document in the cache system.

4. The system of claim 3, wherein the processor is further configured to generate one or more cache fragment identifiers associated with the one or more cache fragments when the one or more portions of the source document include the one or more source fragments, wherein the one or more cache fragment identifiers are also associated with the one or more source fragment identifiers.

5. The system of claim 4, wherein the one or more target fragment identifiers are associated with the one or more cache fragment identifiers.

6. The system of claim 1, wherein the processor is further configured to update a target fragment identifier of the one or more target fragment identifiers associated with a target fragment of the one or more target fragments to include metadata regarding modification of the target fragment, wherein updating the target fragment identifier maintains the association of the target fragment identifier with the cache document identifier and/or the source document identifier.

7. The system of claim 1, wherein the processor is further configured to, in response to determining that the at least one of the one or more portions of the source document has been modified:

generate one or more notifications regarding modification of the source document; and output the one or more notifications to one or more users associated with the target document.

8. The system of claim 1, wherein the processor is further configured, in response to the determining that the source document has been modified, to:

identify one or more differences between the at least one of the one or more portions of the source document that has been modified and the portion of the target document associated with the at least one of the one or more portions of the source document; and output, at the user interface, the one or more differences to one or more users associated with the target document.

9. The system of claim 8, wherein the processor is further configured to:

output, in a first region of the user interface, the source document that has been modified; and output, in a second region of the user interface distinct from the first region of the user interface, the target document with one or more annotations showing the one or more differences between the source document that has been modified and the target document.

10. The system of claim 8, wherein the processor is further configured to: in response to receiving, at the user interface, a user input to modify the target document:

create a new version of the target document, wherein one or more modifications to the target document are saved to the new version; and update the one or more target fragment identifiers with information indicating the new version of the target document, wherein the one or more target fragment identifiers are associated with the new version of the target document.

11. The system of claim 1, wherein the processor is further configured to replace, based on one or more resolution criteria and one or more resolution rules, a portion of the target document associated with a portion of the source document that has been modified.

12. The system of claim 11, wherein the processor is further configured to revert the target document from a new version of the target document to a previous version of the target document.

13. The system of claim 1, wherein the system includes a graph data structure, wherein the source document, the cache document, the one or more cache fragments, the one or more target fragments, and/or the target document are one or more nodes of the graph data structure, and wherein the source document identifier, the cache document identifier, and/or the one or more target fragment identifiers are one or more edges of the graph data structure.

14. A computer-implemented method, comprising:

receiving, at a user interface, a user input to incorporate by reference one or more portions, that are less than all, of a source document into a target document, wherein the source document is associated with a source document identifier;

comparing the one or more portions of the source document with one or more cache fragments of a cache document;

in accordance with a determination that at least a portion of the one or more portions of the source document does not match any of the one or more cache fragments, caching the portion of the one or more portions of the source document as a cache fragment of the one or more cache fragments of the cache document, wherein a cache document identifier is associated with the cache document and the source document identifier;

generating, based on the one or more portions of the source document to be incorporated by reference, the target document including one or more target fragments, that include the one or more cache fragments;

generating one or more target fragment identifiers associated with the one or more target fragments and also associated with the cache document identifier, the source document identifier, or both the cache document identifier and the source document identifier; and in accordance with a determination that at least one of the one or more portions of the source document has been modified, updating, based on the one or more target fragment identifiers associated with the modified source document, the one or more portions of the source document that are incorporated by reference into the target document.

15. The computer-implemented method of claim 14, wherein the one or more portions of the source document include one or more source fragments, wherein the source fragments are associated with one or more source fragment identifiers.

16. The computer-implemented method of claim 15, wherein generating the cache document includes copying the one or more source fragments of the source document as the one or more cache fragments of the cache document in a cache system.

17. The computer-implemented method of claim 16, comprising generating one or more cache fragment identifiers associated with the one or more cache fragments when the one or more portions of the source document include the one or more source fragments, wherein the one or more cache fragment identifiers are also associated with the one or more source fragment identifiers.

18. The computer-implemented method of claim 17, wherein the one or more target fragment identifiers are associated with the one or more cache fragment identifiers.

19. The computer-implemented method of claim 14, comprising:

creating a new version of the target document, wherein one or more modifications to the target document are saved to the new version; and updating the one or more target fragment identifiers with information indicating the new version of the target document, wherein the one or more target fragment identifiers are associated with the new version of the target document.

20. A non-transitory computer readable medium having instructions stored thereon, wherein the instructions, when executed by at least one processor, cause at least one device to perform operations comprising:

receiving, at a user interface, a user input to incorporate by reference one or more portions, that are less than all, of a source document into a target document, wherein the source document is associated with a source document identifier;

comparing the one or more portions of the source document with one or more cache fragments of a cache document;

in accordance with a determination that at least a portion of the one or more portions of the source document does not match any of the one or more cache fragments, caching the portion of the one or more portions of the source document as a cache fragment of the one or more cache fragments of the cache document, wherein a cache document identifier is associated with the cache document and the source document identifier;

generating, based on the one or more portions of the source document to be incorporated by reference, the target document including one or more target fragments, that include the one or more cache fragments;

generating one or more target fragment identifiers associated with the one or more target fragments and also associated with the cache document identifier, the source document identifier, or both the cache document identifier and the source document identifier; and in accordance with a determination that at least one of the one or more portions of the source document has been modified, updating, based on the one or more target fragment identifiers associated with the modified source document, the one or more portions of the source document that are incorporated by reference into the target document.

\* \* \* \* \*